US008940433B2

(12) United States Patent
Steimle et al.

(10) Patent No.: US 8,940,433 B2
(45) Date of Patent: Jan. 27, 2015

(54) THIAZOLE COMPOUNDS AS ADDITIVES IN ELECTROLYTE SOLUTIONS IN ELECTROCHEMICAL CELLS AND BATTERIES

(75) Inventors: Xiao Steimle, Immenstaad (DE); Itamar Michael Malkowsky, Speyer (DE); Klaus Leitner, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 640 days.

(21) Appl. No.: 12/966,510

(22) Filed: Dec. 13, 2010

(65) Prior Publication Data

US 2011/0143220 A1 Jun. 16, 2011

(30) Foreign Application Priority Data

Dec. 15, 2009 (EP) .................................. 09179174

(51) Int. Cl.
*H01M 10/052* (2010.01)
*C25D 3/02* (2006.01)
*H01M 10/0567* (2010.01)

(52) U.S. Cl.
CPC ........ *H01M 10/0567* (2013.01); *H01M 10/052* (2013.01); *H01M 2300/0025* (2013.01); *Y02E 60/122* (2013.01)
USPC ........... 429/188; 429/336; 429/324; 429/341; 205/261

(58) Field of Classification Search
USPC ........... 429/336, 324, 341, 188, 338; 205/261
See application file for complete search history.

(56) References Cited

U.S. PATENT DOCUMENTS

| 3,748,236 | A | * | 7/1973 | Schevey ........................ 205/274 |
| 5,654,114 | A | * | 8/1997 | Kubota et al. .................. 429/338 |
| 2002/0018940 | A1 | | 2/2002 | Nirasawa et al. |
| 2002/0155354 | A1 | * | 10/2002 | Wariishi et al. ............... 429/317 |
| 2003/0190530 | A1 | | 10/2003 | Yang et al. |
| 2004/0025933 | A1 | | 2/2004 | Chittibabu et al. |
| 2005/0039790 | A1 | | 2/2005 | Chittibabu et al. |
| 2005/0208385 | A1 | | 9/2005 | Nirasawa et al. |
| 2009/0133743 | A1 | * | 5/2009 | Matsui ........................... 136/252 |
| 2009/0272934 | A1 | | 11/2009 | Chittibabu et al. |
| 2010/0229950 | A1 | | 9/2010 | Kuang et al. |
| 2011/0003071 | A1 | | 1/2011 | Uensal et al. |
| 2011/0003189 | A1 | | 1/2011 | Hildebrandt et al. |

FOREIGN PATENT DOCUMENTS

| CN | 1819324 A | | 8/2006 |
| DE | 102005016819 A1 | * | 10/2006 |
| EP | 0 684 620 A1 | | 11/1995 |
| EP | 1 148 570 A2 | | 10/2001 |
| EP | 1 202 374 A1 | | 5/2002 |
| EP | 1 819 005 A1 | | 8/2007 |
| JP | 6-349523 A | | 12/1994 |
| JP | 2001-143748 A | | 5/2001 |
| JP | 2003-123837 A | | 4/2003 |
| KR | 20100096813 A | * | 9/2010 |
| WO | WO 2010/063489 A1 | | 6/2010 |
| WO | WO 2010/081698 A1 | | 7/2010 |
| WO | WO 2010/106072 A2 | | 9/2010 |
| WO | WO 2010/145827 A2 | | 12/2010 |
| WO | WO 2011/000858 A1 | | 1/2011 |

OTHER PUBLICATIONS

English translation of German patent document DE 102005016819, Oct. 19, 2006.*
English translation of Japanese patent document JP 06-349523, Dec. 22, 1994.*
Machine translation of Korean Patent Publication No. KR 20100096813 A, Sep. 2, 2010.*
Kusama, H. and Arakawa, H. "Influence of benzimidazole additives in electrolytic solution on dye-sensitized solar cell performance", J. Photochem Photobiol A: Chemistry 162 (2004), pp. 441-448.*
"Physical Constants of Organic Compounds" in CRC Handbook of Chemistry and Physics, 94th Edition (Internet Version 2014), W.M. Haynes, ed., CRC Press/Taylor and Francis, Boca Raton, FL.*
U.S. Appl. No. 13/144,207, filed Jul. 12, 2011, Leitner, et al.
U.S. Appl. No. 13/168,273, filed Jun. 24, 2011, Leitner, et al.
U.S. Appl. No. 13/377,295, filed Dec. 9, 2011, Belack, et al.
U.S. Appl. No. 13/316,864, filed Dec. 12, 2011, Aust, et al.
Soon-Ki Jeong, et al., "Suppression of dendritic lithium formation by using concentrated electrolyte solutions", Science Direct, Electrochemistry Communications 10, 2008, pp. 635-638.
Sheng Shui Zhang, "A review on electrolyte additives for lithium-ion batteries", Science Direct, Journal of Power Sources 162, 2006, pp. 1379-1394.
U.S. Appl. No. 13/132,959, filed Jun. 6, 2011, Leitner, et al.
International Search Report issued on Mar. 2, 2011 in corresponding International Application No. PCT/EP2010/069439.

* cited by examiner

*Primary Examiner* — Milton I Cano
*Assistant Examiner* — Lilia V Nedialkova
(74) *Attorney, Agent, or Firm* — Oblon, Spivak, McClelland, Maier & Neustadt, L.L.P.

(57) ABSTRACT

The present invention relates to an electrolyte solution comprising at least one solvent as component A, at least one electrolyte as component B and from 0.1 to 20% by weight, based on the total electrolyte solution, of at least one heteroaromatic compound of the general formula (I) as component C, the use of such a compound in electrolyte solutions, the use of such an electrolyte solution in an electrochemical cell or for metal plating, and also electrochemical cells comprising a corresponding electrolyte solution.

4 Claims, 2 Drawing Sheets

THIAZOLE COMPOUNDS AS ADDITIVES IN ELECTROLYTE SOLUTIONS IN ELECTROCHEMICAL CELLS AND BATTERIES

The present invention relates to an electrolyte solution comprising at least one solvent as component A, at least one electrolyte as component B and from 0.1 to 20% by weight, based on the total electrolyte solution, of at least one heteroaromatic compound of the general formula (I) as component C, the use of such a compound in electrolyte solutions, the use of such an electrolyte solution in an electrochemical cell or for metal plating, and also electrochemical cells comprising a corresponding electrolyte solution.

Electrolyte solutions for use in electrochemical cells or in metal plating are already known from the prior art.

Jeong et al., Electrochem. Comm. 10 (2008), 635 to 638, disclose a method of avoiding the formation of dendritic lithium crystals in concentrated electrolyte solutions. The electrolyte solutions mentioned in this document comprise appropriate lithium salts as electrolytes. Furthermore, the dependence of the formation of corresponding crystals on the concentration of the lithium salt $LiN(SO_2C_2F_5)_2$ is examined.

Zhang et al., J. of Powersources 162 (2006), 1379 to 1394, disclose various additives for electrolyte solutions which can be used in lithium ion batteries. Organic compounds, for example, heterocyclic compounds, carbonates with unsaturated compounds, aromatic compounds having unsaturated substituents, and also phosphorus- or silicon-comprising molecules are proposed as additives. Boron-comprising complexes of dicarboxylic acids are mentioned as further suitable compounds.

The electrolyte solutions of the prior art are capable of improvement in respect of, for example, avoidance of the formation of lithium dendrites during the charging and discharging cycles. Furthermore, electrolyte solutions which have a wide electrochemical window and are stable toward highly reactive lithium should be provided.

It is accordingly an object of the present invention to provide an electrolyte solution by means of which the formation of lithium dendrites during the charging and discharging cycles can be avoided. Furthermore, the electrolyte solution should have advantageous properties for use in rechargeable batteries or in metal plating.

These objects are achieved by an electrolyte solution comprising at least one solvent as component A, at least one electrolyte as component B and from 0.1 to 20% by weight, based on the total electrolyte solution, of at least one compound of the general formula (I),

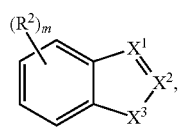

as component C, where $X^1$, $X^2$, $X^3$, $R^2$ and m have the following meanings:
$X^1$, $X^2$ are each, independently of one another, N or CH,
$X^3$ is $NR^1$, O or S,
m is an integer from 0 to 4,
where at least two of $X^1$, $X^2$ and $X^3$ are heteroatoms selected from among N, O and S,
$R^1$ is selected from the group consisting of hydrogen, linear or branched, substituted or unsubstituted $C_1$-$C_{12}$-alkyl which may be interrupted by at least one heteroatom, substituted or unsubstituted $C_3$-$C_{12}$-cycloalkyl which may be interrupted by at least one heteroatom, substituted or unsubstituted $C_5$-$C_{20}$-aryl, substituted or unsubstituted $C_5$-$C_{20}$-heteroaryl, and the radicals $R^2$ are selected independently from the group consisting of linear or branched, substituted or unsubstituted $C_1$-$C_{12}$-alkyl which may be interrupted by at least one heteroatom, substituted or unsubstituted $C_3$-$C_{12}$-cycloalkyl which may be interrupted by at least one heteroatom, substituted or unsubstituted $C_5$-$C_{20}$-aryl, substituted or unsubstituted $C_5$-$C_{20}$-heteroaryl, halides and functional groups having electron-pulling character.

Furthermore, the objects are achieved by the use of a compound of the general formula (I) in electrolyte solutions, by the use of the electron solution mentioned in an electrochemical cell or for metal plating and by an electrochemical cell comprising the electrolyte solution of the invention.

The electrolyte solution of the invention comprises at least one solvent as component A. The at least one solvent present in the electrolyte solution of the invention is known per se to those skilled in the art and is preferably a nonaqueous solvent. In a particularly preferred embodiment, component A is an organic solvent.

In a particularly preferred embodiment, the at least one solvent is selected from the group consisting of carbonates, lactones, heterocyclic compounds, esters, ethers, aromatic compounds and mixtures thereof.

Carbonates which are particularly preferred according to the invention are, for example, selected from the group consisting of ethylene carbonate, propylene carbonate, dimethyl carbonate (DMC), diethyl carbonate (DEC), ethyl methyl carbonate (EMC) and mixtures thereof.

Further suitable solvents are lactones, for example gamma-butyrolactone, gamma-valerolactone and mixtures thereof.

Esters which can be preferably used according to the invention are selected, for example, from among aliphatic esters of monocarboxylic acids having, for example, from 1 to 12 carbon atoms, in particular ethyl acetate, ethyl propionate, methyl butyrate, ethyl butyrate, methyl formate and mixtures thereof.

Ethers which are suitable for the purposes of the invention can be linear or cyclic. Linear ethers are, for example, selected from the group consisting of methylene dimethyl ether (DMM), ethylene dimethyl ether (DME), ethylene diethyl ether (DEE) and mixtures thereof. Cyclic ethers which are particularly suitable according to the invention are, for example, selected from the group consisting of tetrahydrofuran (THF), 2-methyltetrahydrofuran, 1,3-dioxolane, 4-methyl-1,3-dioxolane, 2-methyl-1,3-dioxolane and mixtures thereof.

Aromatic compounds which are preferred according to the invention are, for example, selected from the group consisting of benzene, toluene, chlorobenzene, xylene and mixtures thereof.

In a particularly preferred embodiment, a mixture of at least two of the compounds mentioned is used as solvent in the electrolyte solution of the invention.

Very particular preference is given to using a mixture of at least one cyclic carbonate, for example ethylene carbonate, and at least one linear carbonate, for example, diethyl carbonate, as component A. The mixing ratio in the mixtures of at least two of the solvents mentioned which can preferably be used according to the invention can be varied within a wide range. The mixing ratio can be, for example, from 1:100 to 100:1, preferably from 1:20 to 20:1, particularly preferably from 1:5 to 5:1.

At least one electrolyte is present as component B in the electrolyte solution of the invention.

According to the invention, all electrolytes known to those skilled in the art are suitable as component B in the electrolyte solutions of the invention.

Particular preference is given to electrolytes which have a sufficiently high solubility in the solvents mentioned to give suitable electrolyte solutions. Electrolytes which dissolve completely in the nonaqueous solvent of the electrolyte solution of the invention and dissociate completely are particularly suitable. Furthermore, the solvated ions should have high mobility in the electrolyte solution. For use of the electrolyte solution of the invention in electrochemical cells in particular, the corresponding anion of the electrolyte used should be stable toward oxidative decomposition at the cathode. Furthermore, the anion should be inert to the solvents used. In addition, both parts, viz. the cationic part and the anionic part, of the electrolyte used should be inert to the further components.

In the electrolyte solution of the invention, preference is given to using an electrolyte whose cation is lithium as component B. Lithium is preferably present as cation in the oxidation state +I.

The anion of the electrolyte used according to the invention as component B is selected so that the abovementioned requirements are met, in particular dissociability, inertness and stability. Particularly preferred anions of the electrolyte are, for example, selected from the group consisting of halides, for example fluoride, chloride, bromide, iodide, oxides, hydroxides, anionic boron, phosphorus and/or arsenic complexes, triflates, imides, perchlorates and combinations thereof.

In the electrolyte solution of the invention, particular preference is given to using at least one electrolyte selected from the group consisting of lithium halides, in particular lithium chloride LiCl or lithium fluoride LiF, lithium oxide $Li_2O$, lithium salts of boron, phosphorus, arsenic complexes, in particular lithium tetrafluoroboranate, lithium hexafluorophosphate $LiPF_6$, lithium hexafluoroarsenate, lithium perchlorate, lithium triflate, lithium imide, lithium bis(trifluoromethanesulfonyl)imide and derivatives thereof and mixtures as component B.

Very particular preference is given to using lithium hexafluorophosphate $LiPF_6$ as electrolyte (component B) in the electrolyte solution of the invention.

The at least one electrolyte is generally present in the electrolyte solution of the invention in an amount which ensures a sufficiently high conductivity of the electrolyte solution. For example, the at least one electrolyte is present in a concentration of from 0.1 to 10 mol/l, preferably from 0.2 to 2 mol/l, very particularly preferably from 0.5 to 1.5 mol/l, in the electrolyte solution of the invention.

For the other electrolytes mentioned, the corresponding percentages by weight can be calculated by a person skilled in the art.

The electrolyte solution of the invention comprises from 0.1 to 20% by weight, preferably from 0.1 to 5.0% by weight, particularly preferably from 1.0 to 3.0% by weight, in each case based on the total electrolyte solution, of at least one compound of the general formula (I) as component C,

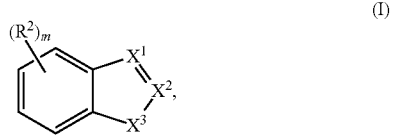

where $X^1$, $X^2$, $X^3$, $R^2$ and m have the following meanings:
$X^1$, $X^2$ are each, independently of one another, N or CH,
$X^3$ is $NR^1$, O or S,
m is an integer from 0 to 4,
where at least two of $X^1$, $X^2$ and $X^3$ are heteroatoms selected from among N, O and S,
$R^1$ is selected from the group consisting of hydrogen, linear or branched, substituted or unsubstituted $C_1$-$C_{12}$-alkyl which may be interrupted by at least one heteroatom, substituted or unsubstituted $C_3$-$C_{12}$-cycloalkyl which may be interrupted by at least one heteroatom, substituted or unsubstituted $C_5$-$C_{20}$-aryl, substituted or unsubstituted $C_5$-$C_{20}$-heteroaryl, and
the radicals $R^2$ are selected independently from the group consisting of linear or branched, substituted or unsubstituted $C_1$-$C_{12}$-alkyl which may be interrupted by at least one heteroatom, substituted or unsubstituted $C_3$-$C_{12}$-cycloalkyl which may be interrupted by at least one heteroatom, substituted or unsubstituted $C_5$-$C_{20}$-aryl, substituted or unsubstituted $C_5$-$C_{20}$-heteroaryl, halides and functional groups having electron-pulling character.

In a preferred embodiment, $X^1$ is N.
In a further preferred embodiment, $X^2$ is CH.
In a further preferred embodiment, $X^3$ is S or O, particularly preferably S.
In a particularly preferred embodiment, $X^1$ is N, $X^2$ is CH and $X^3$ is S in the compound of the general formula (I).
In the general formula (I), m indicates the number of substituents $R^2$ located on the aromatic ring. m is preferably 0, 1, 2, 3, or 4, very particularly preferably 0, 1 or 2, in particular 0.

In a preferred embodiment, the radicals $R^2$ are selected independently from the group consisting of linear or branched, substituted or unsubstituted $C_1$-$C_{12}$-alkyl, preferably $C_1$-$C_6$-alkyl, particularly preferably $C_1$-$C_3$-alkyl, which may be interrupted by at least one heteroatom, for example methyl, ethyl, propyl, substituted or unsubstituted $C_5$-$C_{20}$-aryl, for example phenyl or naphthyl, and functional groups having electron-pulling character, for example groups selected from the group consisting of halides, for example fluoride.

If present, $R^1$ is preferably selected from the group consisting of $C_1$-$C_6$-alkyl, particularly preferably $C_1$-$C_3$-alkyl.

Substituents which may be present on $R^1$ and/or $R^2$ are, according to the invention, selected independently from the group consisting of linear or branched, substituted or unsubstituted $C_1$-$C_{12}$-alkyl which may be interrupted by at least one heteroatom, substituted or unsubstituted $C_3$-$C_{12}$-cycloalkyl which may be interrupted by at least one heteroatom, substituted or unsubstituted $C_5$-$C_{20}$-aryl, substituted or unsubstituted $C_5$-$C_{20}$-heteroaryl, halides and functional groups, for example CN, and mixtures thereof.

In a very particularly preferred embodiment, $X^1$, $X^2$, $X^3$ and m have the following meanings:
$X^1$ is N,
$X^2$ is CH,
$X^3$ is S,
m is 0, i.e. particular preference is given to using benzothiazole of the formula (Ia) as compound of the general formula (I) as component C

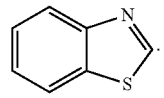
(Ia)

Therefore, a very particularly preferred embodiment of the present invention provides an electrolyte solution according to the invention in which benzothiazole is present as compound of the general formula (I).

In the particularly preferred embodiment in which the electrolyte solution of the invention consists exclusively of the components A, B and C, the amounts of the components A, B and C add up to 100% by weight.

In a very particularly preferred embodiment, the present invention provides an electrolyte solution comprising a mixture of at least one cyclic carbonate, for example ethylene carbonate, and at least one linear carbonate, for example diethyl carbonate, as component A, lithium hexafluorophosphate $LiPF_6$ as component B and benzothiazole as component C, in each case in the amounts indicated above.

The present invention also provides for the use of a compound of the general formula (I) in electrolyte solutions. In particular, the present invention provides the stated use, with the compound of the general formula (I) being used in electrochemical cells.

As regards the preferred embodiments of the compound of the general formula (I), what has been said above applies. Particular preference is given to using benzothiazole as compound of the general formula (I).

Electrochemical cells, in particular their structure and the components comprised, are known per se to those skilled in the art. The compound of the general formula (I) is particularly preferably used in batteries, in particular in rechargeable batteries. The general structure of these is described, for example, in "Lithium ion batteries: Science and Technologies, Gholam-Abbas Nazri, Gianfranco Pistoia, 2009". These electrochemical cells generally comprise, apart from the electrolyte, at least one anode, for example a lithium anode, a cathode, for example a copper cathode, lithium and also appropriate insulation elements and connections.

Furthermore, the present invention provides the use according to the invention in which the compound of the general formula (I) is used for metal plating.

Processes for metal plating are known per se to those skilled in the art and are described, for example, in "Praktische Galvanotechnik" by P. W. Jelinek, Eugen G. Lenze Verlag, 2005. Use of the compound of the general formula (I) enables, for example, lithium to be applied to an appropriate substrate, for example a copper substrate.

Furthermore, the present invention provides for the use of the electrolyte solution of the invention in an electrochemical cell or for metal plating. Preferred embodiments of the electrolyte solution of the invention and details of electrochemical cells or of metal plating have been mentioned above.

FIGURES

| | |
|---|---|
| solid line: | CC for electrolyte without benzothiazole, |
| broken line: | CC for electrolyte with benzothiazole |
| solid line with triangles: | DC for electrolyte without benzothiazole |
| broken line with triangles: | DC for electrolyte with benzothiazole |

Here, CC is the "charging current", i.e. the current applied for charging the battery. DC is the "discharging current", i.e. the current which is applied during discharging.

Figure 3:
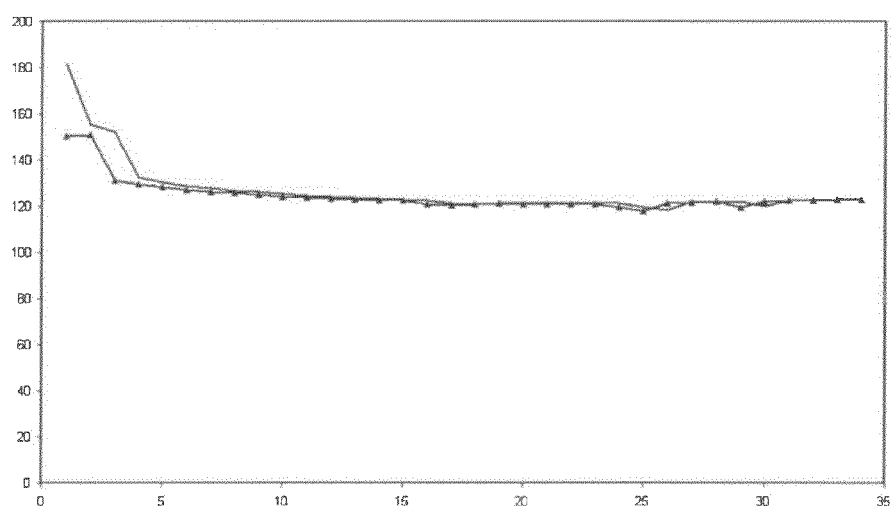

FIG. 3 shows the cyclability of a C/NMC cell (Example 4). The capacity in mAh/g is plotted on the y axis, and the cycle number is plotted on the x axis.

In this figure:

| | |
|---|---|
| solid line: | CC for electrolyte |
| solid line with triangles: | DC for electrolyte |

For definitions of CC and DC, see above.

EXAMPLES

Example 1

Determination of the Electrochemical Window by Cyclic Voltammetry (CV)

Figure 1:
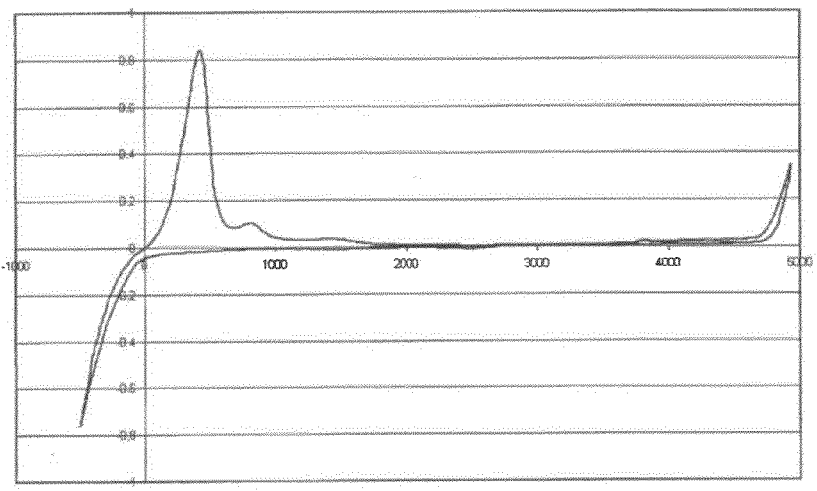
FIG. 1 shows a cyclic voltammogram using 3% by weight of benzothiazole in an EC/DEC electrolyte (Example 1). The current in mA is plotted on the y axis, and the potential in mV is plotted on the x axis.

The experiment is carried out in a plastic-coated glass vessel. The working electrode (WE) is a platinum ring electrode having an area of 0.04 cm², and the reference electrode (RE) is lithium metal and is located in the vicinity of the working electrode. The counterelectrode (CE) is a lithium plate. The electrolyte solution used is a mixture of ethylene carbonate (EC) and diethyl carbonate (DEC) in a ratio of 1:3 (volume). 5% by weight of benzothiazole are added to this electrolyte solution. The electrolyte is $LiPF_6$, one molar in the stated solution. The scan rate employed is 20 mV/s in the range from −0.5 V to 5 V relative to Li/Li+. The electrochemical window at 4.8 V is shown in FIG. 1.

Example 2

Lithium Plating and Morphology

The electrochemical lithium plating experiment is carried out in a plastic-coated glass vessel. Counterelectrode and working electrode are lithium plates having an area of 3.0 cm². Lithium metal is used as reference electrode. The working electrode is supplied with a constant cathode current of 1 mA/cm². The electrolyte composed of ethylene carbonate and diethyl carbonate (1:3 v/v) with 5% by weight of benzothiazole and a control electrolyte are tested under identical conditions.

The controlled experiment gives a very loose lithium deposit with very poor adhesion to the plate. The experiment using benzothiazole as additive gives a very dense, fine deposit with good adhesion. The current efficiency is calculated as 98%.

Example 3

Cell Cycle

Figure 2:
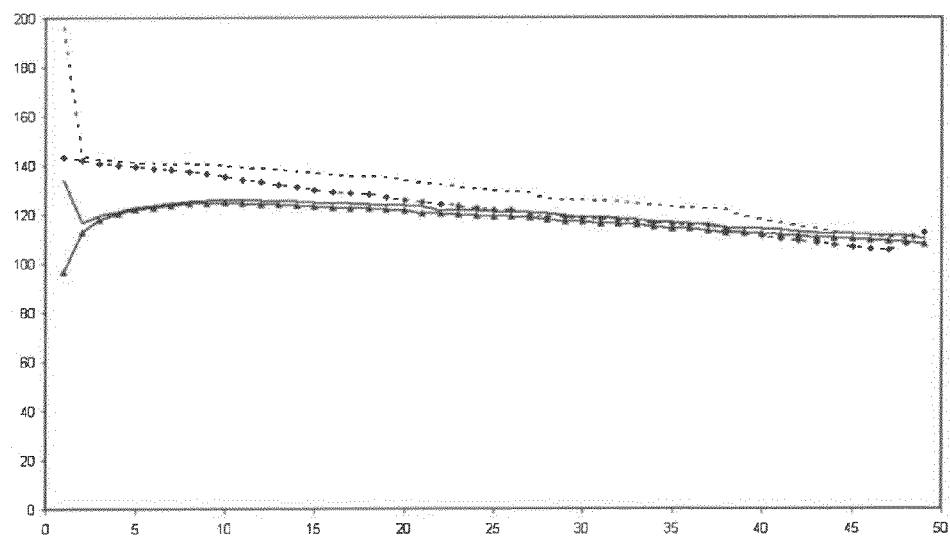
FIG. 2 shows the cyclability of an Li/NCA cell (Example 3). The capacity in mAh/g is plotted on the y axis, and the cycle number is plotted on the x axis.

In a Swagelok 3-electrode cell, lithium foil is used as anode on a copper foil as current collector. NCA (Li—Ni—Co oxide) coated with an aluminum current collector is used as cathode material; lithium is once again used as reference electrode. The cell is assembled under an argon atmosphere in a glove box, with all components having been dried overnight at 120° C. in a vacuum oven. The cell is cycled between 3 V and 4.2 V below 1 C. Electrolytes with and without benzothiazole are tested. FIG. 2 shows that benzothiazole improves the cyclability of the cell.

In a further test, NMC (Li—Ni—Mn—Co oxide) is used as cathode material and graphite is used as anode material. The Swagelok setup and the test conditions are retained. FIG. 3 shows the stable performance in the presence of benzothiazole, which shows that benzothiazole does not have any negative effect on the graphite anode.

The invention claimed is:

1. An electrolyte solution for metal plating comprising at least one solvent selected from the group consisting of a carbonate, heterocyclic compound, ester, ether, aromatic compound and a mixture thereof, as component A, at least one electrolyte as component B and from 0.1 to 20% by weight, based on the total electrolyte solution, of at least one compound of the formula (I),

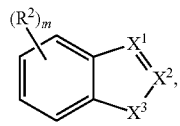
(I)

wherein $X^1$ is N, $X^2$ is CH, $X^3$ is O or S, m is an integer from 1 to 4, and the radicals $R^2$ are selected independently from the group consisting of linear or branched, substituted or unsubstituted $C_1$-$C_{12}$-alkyl which may be interrupted by at least one heteroatom, substituted or unsubstituted $C_3$-$C_{12}$-cycloalkyl which may be interrupted by at least one heteroatom, substituted or unsubstituted $C_5$-$C_{20}$-aryl, substituted or unsubstituted $C_5$-$C_{20}$-heteroaryl, halides and functional groups having electron-pulling character.

2. The electrolyte solution according to claim 1, wherein the at least one electrolyte, which is the component B is selected from the group consisting of lithium halide, lithium oxide, lithium salt of boron, phosphorus, arsenic complex, lithium perchlorate, lithium triflate, lithium imide, lithium bis(trifluoromethane-sulfonyl) imide, derivative thereof and a mixture thereof.

3. A method of making an electrolyte solution for metal plating comprising adding a compound of the formula (I) as defined in claim 1 to an electrolyte solution.

4. The electrolyte solution according to claim 1, wherein the content of the at least one compound of the formula (I) is from 3 to 20 weight % based on the total electrolyte solution.

* * * * *